June 22, 1926.　　　　1,589,379
C. J. Z. FANBERG
VARIABLE TRANSMISSION DEVICE
Filed March 8, 1923
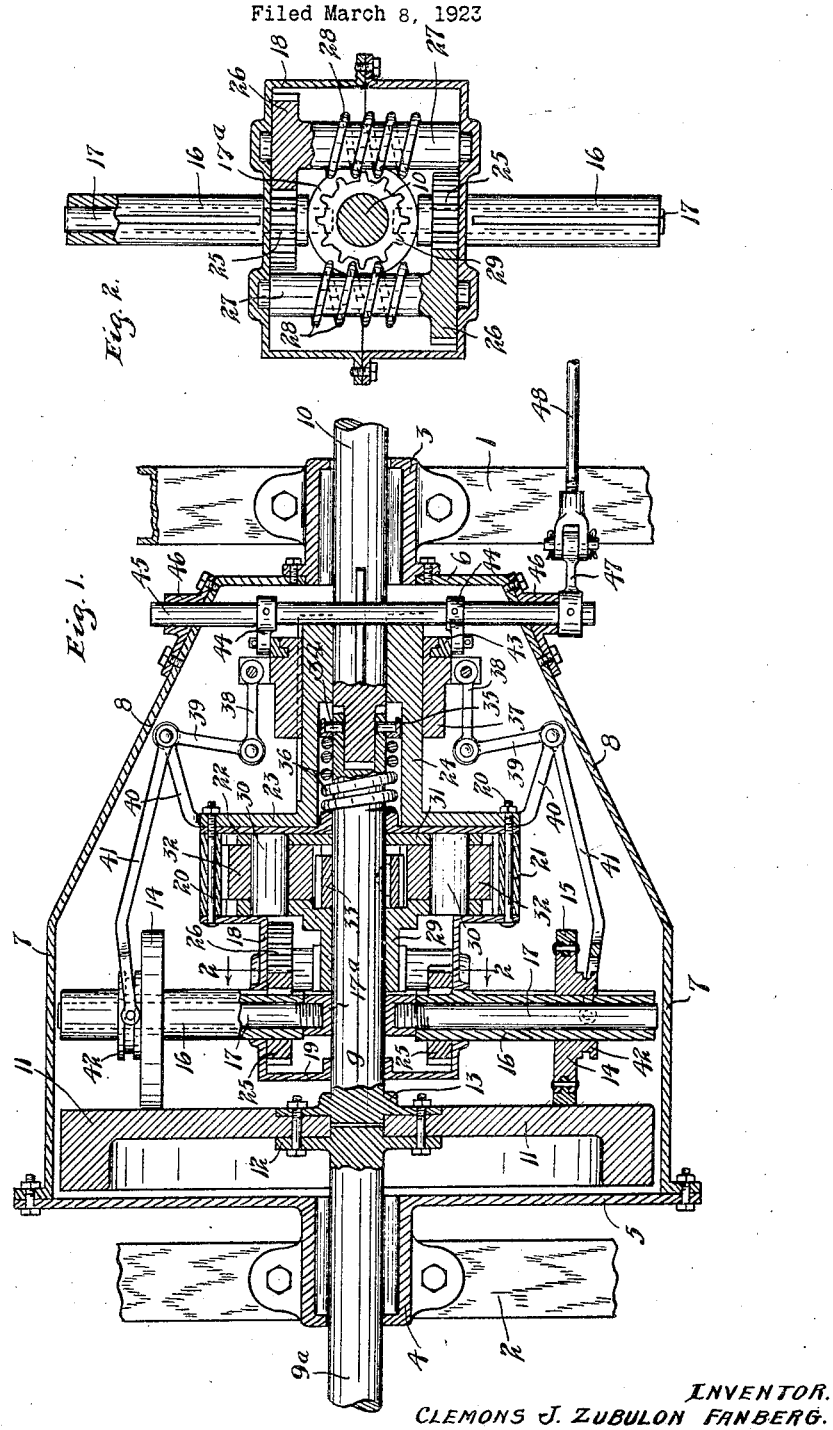
INVENTOR.
CLEMONS J. ZUBULON FANBERG.
BY HIS ATTORNEY.

Patented June 22, 1926.

1,589,379

UNITED STATES PATENT OFFICE.

CLEMONS J. ZEBULON FANBERG, OF KERKHOVEN, MINNESOTA.

VARIABLE TRANSMISSION DEVICE.

Application filed March 8, 1923. Serial No. 623,777.

This invention relates to a transmission mechanism, and while said mechanism is capable of use wherever it is desired to drive one shaft or moving part from another shaft or moving part, said mechanism is more particularly designed to be used on a vehicle, such as a modern automobile or truck.

As is well known, it is customary and desirable in such vehicles to have a plurality of gear speeds for propelling the vehicle. It is also customary to provide a plurality of such transmission gear speeds for driving the vehicle forward and to provide at least one transmission gear speed for driving the vehicle in a reverse direction. It is also desirable and customary to have the transmission arranged to occupy a neutral position, in which position the driving or motor shaft can rotate without driving the transmission shaft.

It is an object of this invention to provide a transmission mechanism in which one shaft is rotated from another through a differential driving means, which means is controlled by a friction gear mechanism having a friction disk movable along an axis at right angles to said shafts.

It is also an object of the invention to provide such transmission mechanism in which a friction disk is secured to one of the shafts and a friction wheel is carried by a member on the other of said shafts for engagement with said disk and adapted to be moved thereacross. Said friction wheel is adapted to be rotated on its axis by said wheel and to actuate a differential mechanism, which in turn influences another differential mechanism carried by the driven shaft.

It is more specifically an object of the invention to provide such a transmission mechanism as set forth in which the said friction wheel, by its rotation, operates one differential mechanism, which carries a planetary element in another differential mechanism, said planetary element engaging a gear on the driving shaft and being, in turn, engaged by an orbit gear carried by a frame slidably secured on the driven shaft and carrying said friction wheel.

It is also an object of the invention to provide such transmission mechanism as indicated having means for holding the friction wheel in engagement with a friction disk and simple and efficient means for moving the friction wheel across the friction disk and to provide such a transmission mechanism capable of being housed in a closed casing in compact arrangement.

These and other objects and advantages of the invention will be fully set forth in the following description made in connection with the accompanying drawings in which like reference characters refer to the same parts throughout the different views, and in which, Fig. 1 represents a horizontal central section through the transmission mechanism showing a portion of the frame to which the same is attached; and Fig. 2 is a vertical section taken on the line 2—2 of Fig. 1, as indicated by the arrows.

Referring to the drawings, two spaced portions of the frame of a vehicle to which the mechanism is illustrated as being attached are shown as 1 and 2. To these frame members are bolted bearing members 3 and 4 having attaching lugs thereon and illustrated as being of the well known roller bearing type. The bearing 4 has a circular plate or disk 5 secured thereto and the bearing 3 has bolted thereto a plate 6 which forms the end wall of a cylindrical casing 7 having a tapered or frusto-conical portion 8 at the end formed by the plate 6. Said casing 7 is provided with an out-turned flange at the end adjacent the plate 5 to which plate said flange is secured by circumferentially spaced headed and nutted bolts.

The transmission mechanism is designed to connect two shafts illustrated as 9 and 10, one of which will form a driving shaft and the other of which will be driven. While either shaft could be used as a driving shaft, in the embodiment of the invention illustrated the shaft 9 will be referred to as the driving shaft and when the invention is applied to a vehicle, said shaft would constitute the motor shaft. To the shaft 9 is secured a disk member 11, said shaft having a flange 12 bolted to said disk by circumferentially spaced headed and nutted bolts which also pass through and secure to said disk a plate 13 integrally or otherwise secured to shaft 9 and having a flange received in a recess in said disk 11. Shaft 9 is thus in two sections, this structure being used for convenience of assembly. In vehicle motors as now generally used, a fly wheel is attached to the motor shaft and in the embodiment of the present invention illustrated the disk 11 is arranged to constitute the fly wheel for which purpose it is made of heavy cross-section and with a heavy peripheral rim. Engaging the flat surface of the disk 11 are friction wheels 14 disposed on opposite sides of the shaft 9, which wheels preferably will be provided with peripheral elements 15 of frictional material such as hard fiber. The wheels 14 are splined to and slidable on sleeve members 16 arranged to rotate on shafts 17 secured in any suitable manner as by being threaded into a yoke member 17ª journaled on the shaft 9 and disposed in the frame or casing 18. The casing 18 is provided with a front wall 19 having a hub also journaled on the shaft 9 and is at its rear end provided with an outwardly extending flange bolted by suitable circumferentially spaced bolts 20 to an internal or orbit gear frame 21. The casing 18 is substantially cylindrical and has oppositely projecting hubs in which the sleeves 16 turn. The member 21 has bolted thereto at its rear sides a plate 22 provided with a central hub journaled on the shaft 9 and also bolted thereto a member 23 having a flange of the same diameter as the members 21 and 22, all of which members are secured together by the bolts 20. The member 23 has a sleeve 24 extending rearwardly therefrom, the rear end of which is splined to the shaft 10. It will thus be seen that the casing 18, gear member 21 and the sleeve 24 are all rigidly bolted together and capable of revolution about the shaft 9. The sleeves 16 have secured thereto inside the casing 18, spur gears 25, which gears are arranged in mesh with gears 26 carried on shafts 27 journaled at their ends in casing 18, which shafts are formed at their intermediate portions as, or have secured thereto, worm gears 28, which worm gears are disposed at opposite sides of and mesh with a worm gear 29, which gear is journaled on the shaft 9. Said gear 29 is provided with an outwardly extending flange contacting with the rear side of the casing 18 and short shafts 30 extend through this flange to and through a plate 31 disposed in contact with the inner side of plate 22. The shafts 30 carry pinions 32 which mesh at their outer sides with the orbit gear on member 21 and which mesh at their inner sides with a pinion 33 keyed to the shaft 9. The shafts 9 and 10 have respectively, a central cylindrical recess and a centrally projecting tongue engaging each other so that the shafts are loosely connected longitudinally. Oppositely disposed pins 34 secured in an annular ring 35, which surrounds said shafts extend a short distance into shaft 9 adjacent its end and a coiled spring 36 is disposed about said shaft abutting at one end against the hub on plate 22 and at its other end against the ring 35. The spring 36 tends to force the members 18, 21 and 23 toward the disk 11 and thus holds the friction wheels 14 in firm engagement with the disk 11. A sleeve member 37 is splined on the sleeve 24 for sliding movement thereon and has spaced lugs projecting at opposite sides thereof between which are pivoted the links 38 which extend toward the disk 11 and are pivoted at their inner ends to the ends of short arms 39 of bell crank levers pivoted in bracket arms 40 extending from the member 23, the long arms 41 of which levers are provided with forks at their ends embracing grooved collars 42 secured to the friction wheels 14, said forks being pivotally connected to said collars by studs secured therein and extending into the grooves in members 42. The sleeve 37, at its outer end, is provided with a groove receiving a flanged collar or slip ring 43 in which the sleeve 37 rotates. The said ring has projecting pintles at opposite sides thereof pivotally received in the ends of arms 44 extending radially from a shaft 45 journaled to oscillate in bearings 46 bolted to and projecting from the outer side of the portion 8 of the casing 7. Small pins extend through the ends of the pintles on the ring 43 to insure retention thereon of the arms 44. The shaft 45 carries adjacent one of the bearings 46 another arm 47, the outer end of which is pivotally connected to the forked end of a rod 48.

In operation, the motor shaft 9 will be rotated and will rotate the disk 11. The friction wheels 14 will be held against the disk 11 by a strong pressure from the spring 36. There will be a tendency for the disk 11 to rotate the wheels 14 about their axes if there is any resistance to the body revolution thereof with said disk. When the friction wheels 14 rotate on their axes, they rotate the gears 25 which, in turn, rotate the gears 26, which are secured rigid with the worm gears 28. These worm gears operate on opposite sides of the worm wheel gear 29 and rotate this gear. Assuming that the rotation of the disk 11 is in a clockwise direction, the gear 29 will also be rotated in a clockwise direction. This gear 29 carries rigid therewith shafts 30 on which are mounted the pinions 32 so that said pinions are bodily rotated in a clockwise direction. The internal or orbit gear on the member 21 also tends to rotate in a clockwise direction with the disk 11. If now the wheels 14 are rotated on their axes so as to revolve the member 29 and pinions 32 at substantially the same speed as it would be revolved by gear 33 with gear 21 held stationary then the member 29 and pinions 32 will merely be carried around the gear 21 and no motion will be transmitted to member 24 or shaft 10. When this operation of the device occurs, the wheels 14 are in position of neutral or such position that the shaft 10 will not be driven by the shaft 9 and such position is substantially indicated in Fig. 1. The ratio between gears 21 and 33 as illustrated, is substantially 4 to 1 and with the device in neutral position as above described, the action of the parts with the friction wheels disposed as set forth, is to drive the gear 29 at approximately one-fourth the speed of the driving shaft 9. It will be seen that by a push or pull on rod 48 that shaft 45 will be rotated, sleeve 37 moved longitudinally on sleeve 24 and the bell crank lever arms 41 will be swung to move the wheels 42 inwardly and outwardly across the face of the disk 11. When said wheels 14 are moved outwardly from the position shown, toward the edge of disk 11, they will drive the gear 29 at a greater speed than that at which it revolves in the neutral position of the device, and thus will effect the rotation of the driven element 10, in the same direction as the driving shaft but at a lower speed. As the friction wheels 14 are moved further outward, they approach a point on the disk 11 at which they will drive gear 29 at the same speed as the driving shaft and the gear 33 are rotating, and thus will cause the driven gear 21 to be carried around with and at the same speed as the gears 29 and 33. The actual speed of the driven shaft will, of course, depend upon the range of movement of the wheels 14 outwardly on the disk 11 and the speed of the driven shaft can be increased with the different ratio between the gears 33 and 21. If the wheels 14 be moved inwardly from the position of neutral adjustment, the speed of the gear 29 will be reduced below that at which it rotates in the neutral position and thus will cause the gear 21 to be rotated in the direction opposite to that of the driving shaft. The greater the reduction of speed in gear 29, the greater will be the speed of this reverse rotation of gear 21. This reverse speed, however, will of course be limited by the gear ratios used in the device. One of these reverse speeds preferably will be used as the forward speed of the vehicle driven by the transmission mechanism. As before stated, if there were no resistance to the bodily rotation of the wheels 14 with the disk 11, such movement would occur but as there is resistance to such movement and to movement of shaft 10, a great tendency will be exerted to rotate the wheels 14 on their axes so that said wheels will, in effect, bite into the disk 11 and be rotated at greater speed while the bodily rotation of the wheels 14 is reduced. It will thus be seen that the shaft 10 can be driven at a great range of speed from the shaft 9. The wheels 14, as stated, will be held with great pressure constantly against the disk 11 by the spring 36.

From the above description, it is seen that applicant has provided a comparatively simple and efficient transmission mechanism and one which will give a great range of relative speeds between the shafts 9 and 10. In practice, the inner casing 18 with the parts 21 and 23 can be arranged to contain oil for lubrication or, if desired, oil may also be carried in the outer casing 7. By having oil only in the inner casing, a practically perfect lubrication of all of the parts will be attained. The parts are all easily made and easily assembled and the mechanism, as a whole, is very compact. The transmission mechanism while having a great utility on a vehicle will also be very suitable for driving various kinds of machinery, such as machine tools, including lathes, drills and boring machines. The mechanism is adapted to replace the ordinary clutch, especially the variable speed clutches and will give a much better torque in starting.

It will, of course, be understood that various changes may be made in the form, details, arrangement and proportions of the parts without departing from the scope of applicant's invention, which, generally stated, consists in the matter shown and described and set forth in the appended claims.

What is claimed is:

1. A transmission mechanism comprising a pair of shafts, one of which is a driving shaft and the other of which is a driven shaft, a differential mechanism connecting said shafts, a variable resistance means including a friction wheel movable toward and from said driving shaft and connected to the differential mechanism whereby the speed of the driven shaft will be varied and means carried by said differential mechanism for moving said friction wheel toward and from said driving shaft.

2. A transmission mechanism comprising a pair of shafts, one of which is a driving shaft and the other of which is a driven shaft, a differential mechanism including a planetary element connecting said shafts, a friction disk secured to said driving shaft, a friction wheel engaging said disk to be rotated thereby, a gear driven by the rotation of said wheel, and connected to the planetary element of said differential mechanism, whereby the speed of the driven shaft will vary with the distance of said friction wheel from the driving shaft, means concentric with and carried by said driven shaft and slidable longitudinally thereof and connected to said friction wheel for moving the same toward and away from said driving shaft and rotatable means disposed in one side of said driven shaft for sliding said means.

3. A transmission mechanism comprising a pair of shafts, one of which is a driving shaft and the other of which is a driven shaft, a differential mechanism connecting said shafts including a planetary element and an orbit gear meshing therewith, a friction disk secured to said driving shaft, a friction wheel engaging said disk and adapted to be rotated thereby, a shell carrying said planetary element and carried by a gear geared to and driven by said friction wheel, said orbit gear carrying means in which said friction wheel is journaled and being secured to said driven shaft and slidable thereon and a spring pressing said orbit gear longitudinally of said shafts to hold said friction wheel against said disk.

4. The structure set forth in claim 3, said orbit gear carrying means for moving said friction wheel toward and from the axis of said driving shaft.

5. A transmission mechanism comprising a pair of axially alined shafts, one of which is a driving shaft and the other of which is a driven shaft, a differential mechanism connecting said shafts including a planetary element and an orbit gear meshing therewith and rotatably and slidably carried by the driven shaft, a friction disk carried by said driving shaft, a friction wheel engaging said disk adapted to be rotated thereby and movable toward and from the axis of said driving shaft, a gear journalled on the driving shaft and secured to said planetary element, said last mentioned gear being driven by said friction wheel, a member secured to said orbit gear and rotatable therewith, said friction wheel also being revoluble about said driving shaft with said last mentioned member.

6. A transmission mechanism comprising a pair of co-axial shafts, one of which is the driving shaft and the other of which is a driven shaft, a differential mechanism connecting said shafts including a planetary pinion driven by a gear on the driving shaft and an orbit gear meshing with said planetary pinion and rotatably and slidably secured to the driven shaft, a member secured to said orbit gear and journalled on the driving shaft, said member having a sleeve journalled therein having its axis extending at right angles to the axis of said driving shaft, a friction wheel rotatably secured to said sleeve and engaging said friction disk and movable on said sleeve toward and from the axis of said driving shaft, a gear journalled on the driving shaft and driven by the rotation of said wheel, said last mentioned gear carrying said planetary element.

7. The structure set forth in claim 6, said orbit gear comprising a sleeve, a member slidable on said sleeve, a bell crank lever carried by said orbit gear engaging said friction wheel to move the same toward and from the axis of the driving shaft, and means connecting said lever and said member on said sleeve for moving said friction wheel.

8. The structure set forth in claim 7, and a spring surrounding said driving shaft and housed in said sleeve of said orbit gear for pressing said friction wheel against said friction disk.

9. A transmission mechanism comprising a pair of co-axial shafts, one of which is a driving and the other of which is a driven shaft, a differential mechanism connecting said shafts including a planetary element, a gear journalled on said driving shaft to carry said planetary element, a worm gear at each side of said gear and driving the same, said worm gears having other gears secured thereto, gears meshing with said last mentioned gears and connected to sleeves extending at opposite sides of said driving shaft, friction wheels rotatably secured to said sleeves and slidable thereon, a friction disk carried by said driving shaft with which said friction wheels engage, and means for moving said friction wheels toward and from the axis of said driving shaft.

In testimony whereof I affix my signature.

CLEMONS J. ZEBULON FANBERG.